US008376015B2

(12) United States Patent
Guenter et al.

(10) Patent No.: US 8,376,015 B2
(45) Date of Patent: Feb. 19, 2013

(54) HAND-HELD LABELER WITH IMPROVED LABEL ROLL LIFT MECHANISM

(75) Inventors: Harald Guenter, Heppenheim (DE); Lothar Lutz, Rothenberg (DE); Gilbert Robel, Frankfurt am Main (DE)

(73) Assignee: Checkpoint Systems, Inc., Thorofare, NJ (US)

( * ) Notice: Subject to any disclaimer, the term of this patent is extended or adjusted under 35 U.S.C. 154(b) by 6 days.

(21) Appl. No.: 13/193,908

(22) Filed: Jul. 29, 2011

(65) Prior Publication Data

US 2012/0048474 A1 Mar. 1, 2012

Related U.S. Application Data

(60) Provisional application No. 61/377,163, filed on Aug. 26, 2010.

(51) Int. Cl.
*B32B 37/00* (2006.01)

(52) U.S. Cl. ...... 156/577; 156/574; 156/579; 312/272.5

(58) Field of Classification Search .................. 156/574, 156/577, 579; 312/23, 34.8, 272.5; 220/255, 220/262, 810
See application file for complete search history.

(56) References Cited

U.S. PATENT DOCUMENTS

| | | | | |
|---|---|---|---|---|
| 1,957,293 | A * | 5/1934 | Reilly | 312/272.5 |
| 2,276,711 | A * | 3/1942 | Bilde | 312/272.5 |
| 2,637,614 | A * | 5/1953 | Simos | 312/272.5 |
| 4,699,685 | A * | 10/1987 | Sato | 156/577 |
| 2006/0213620 | A1 | 9/2006 | Shimosaka | |
| 2007/0221336 | A1* | 9/2007 | Crawford et al. | 156/577 |

FOREIGN PATENT DOCUMENTS

| | | |
|---|---|---|
| DE | 2908478 | 9/1980 |
| EP | 0308408 | 9/1991 |
| EP | 0858950 | 8/1998 |

OTHER PUBLICATIONS

International Search Report for corresponding PCT Application No. PCT/US2011/048947 dated Dec. 16, 2011.

* cited by examiner

*Primary Examiner* — Katarzyna Wyrozebski Lee
*Assistant Examiner* — John Blades
(74) *Attorney, Agent, or Firm* — Caesar, Rivise, Bernstein, Cohen & Pokotilow, Ltd.

(57) ABSTRACT

A hand-held labeler is described with a casing having an upper opening in which a label roll is rotary-mounted on a holder that can be moved up and down. A cap is hinged on the casing at the upper opening. When the cap is closed, it fully surrounds the label roll. The cap is coupled with the holder by a link guide in such a way that, by manually swinging the cap, the holder can be moved out of the opening and into the opening while the spacing between the cap and a label roll seated on the holder can be varied. When the cap is fully opened, the label roll is exposed and can easily be taken off the holder or attached to the holder.

5 Claims, 3 Drawing Sheets

HAND-HELD LABELER WITH IMPROVED LABEL ROLL LIFT MECHANISM

CROSS-REFERENCE TO RELATED APPLICATIONS

This utility application claims the benefit under 35 U.S.C. §119(e) of Provisional Application Ser. No. 61/377,163 filed on Aug. 26, 2010 entitled HAND-HELD LABELER WITH IMPROVED LABEL ROLL LIFT MECHANISM and whose entire disclosure is incorporated by reference herein.

BACKGROUND OF THE INVENTION

1. Field of Invention

The present invention relates generally to hand-held labelers and more particularly to a hand-held labeler comprising a casing with an upper opening, a holder for rotary mounting a label roll that is at least partially positioned within the upper opening, a cap that surrounds and is spaced from at least an upper perimeter of a label roll inserted into the upper opening, and a lifting mechanism for moving the holder up and down.

2. Description of Related Art

A conventional hand-held labeler is used to print prices or other information onto labels that are provided on a carrier tape and to subsequently attach the printed labels to goods. Such a labeler is known from EP 0 858 950 B1. The carrier tape with the labels is wound to a label roll that can be rotary mounted in the holder and at least partially sunk into the upper opening of the casing. The holder consists of a pair of articulated arms, one end of which is coupled to the opening of the case and the other to a so-called "loading cassette." The loading cassette comprises a cap with a semicircular cross section and a side wall with a hub mounted to its center. The side of the loading cassette opposite the side wall and the remaining peripheral area of the semicircular cap are open.

When the label roll is placed onto the hub, half of its perimeter and one of its faces are surrounded by the cap. The other half of its perimeter and the other face of the label roll are exposed. The articulated arms comprise a gearing at their lower ends. If the label roll is to be sunk into the opening in the casing, the loading cassette is grabbed with the hand on the cap and pressed downwards. The intermeshing gearings of the articulated arms make the arms perform the same movements, and they are folded more and more in their middle until the loading cassette of the label roll is sunk in far enough that the lower rims of its cap come to rest on the casing near the opening. When the labeler is operated, the label roll is not guided on the open side of the loading cassette so that the carrier tape unwound from the label roll can move outwards and its motion can be obstructed by the casing. A loading cassette that is open on one side also does not ensure that the label tape will remain wound up evenly, i.e., without an axial offset of successive windings. And finally it is difficult to remove the label roll from the loading cassette due to the small spacing between the cap and the label roll.

The only guidance available for the label roll in the loading cassette is provided by the side wall of the loading cassette. If the label roll is to be removed from the device, the loading cassette is grabbed at the cap and manually pulled upwards. When the loading cassette has been lifted far enough that the label roll has been freed from the casing, it can be pulled off the hub.

A hand-held labeler is known from EP 1 308 408 B1 that comprises a cap that is rotary mounted in the casing and prevents the label roll from being removed from its holder. If the label roll is to be removed, the cap has to be flipped open first. Then the label roll can be lifted off by hand, and this or a new label roll can be pressed into the holder until it snaps into position. Then the cap is closed again. While the label roll is guided better in this known labeler than in the labeler described previously, removing and inserting the label roll is still tedious because, when the cap is opened, there are spring plates on both sides of the holder which have to be deflected outwards so that they release the label roll. If the labeler is then reversed, the label roll and the roll core that carried the label tape will fall out due to their own weight. In this way, the label roll or the roll core can be removed from the label roll holding space without having to be touched directly. This process is still tedious because one first has to open the cap and unlock the locking elements to be able to remove the label roll.

All references cited herein are incorporated herein by reference in their entireties.

BRIEF SUMMARY OF THE INVENTION

The aim of this invention is to improve a labeler of the type initially mentioned in such a way that the label roll is better guided and can be inserted and removed more easily, resulting in a labeler which is simpler in design.

This problem is solved with a hand-held labeler wherein the cap is hinged on the upper opening of the casing and the cap is further designed in such a way that it completely surrounds a label roll mounted by the holder and being at least partially positioned within the upper opening, and wherein the lifting mechanism includes a mechanical coupling between the cap and the holder so that the holder can be moved out of the opening and into the opening by manually swinging the cap while the spacing between the cap and the holder can be varied.

The label roll inserted into the labeler according to the present invention is completely surrounded by the cap so that the label roll has optimum guidance and the label strip cannot leave its intended track of travel when the labeler is operated. While the cap lifts the label roll with its holder when the cap is opened, it also moves away from the label roll, thereby increasing the spacing between the cap and the label roll. In this way, access to the holder for rotary mounting the label roll is improved, and the label roll can easily be grabbed manually and placed onto or pulled off its holder. When the cap is closed, it once again moves over the label roll to finally surround it completely. The mechanical coupling between the cap and the holder ensures that the label roll is inevitably transported along during opening and closing to be brought into a position in which it can either be removed without obstruction or is fully surrounded and excellently guided.

In one embodiment of the labeler according to the present invention, the mechanical coupling comprises a link guide arranged on the cap and a cam associated with the holder and engaging in the link guide. The cap and the holder are thus mechanically coupled in a simple and trouble-free manner.

In another embodiment of the labeler according to the present invention, the link guide is a slot or groove-like arched recess in or on an extension of a side wall of the cap. In this way, the link guide can be mounted to the cap itself in a simple manner.

In another embodiment of the labeler according to the present invention, the holder for rotary mounting the label roll comprises a hub with a flange into or onto which the cam is attached and in or on which the side wall extension with the link guide can be moved. This embodiment represents a simple way of providing the cam on the holder.

In yet another embodiment of the labeler according to the present invention, the flange is made of two disks arranged at a spacing between which a hollow space is formed into which a pin extends that forms the cam. In this embodiment, the side wall extension of the cap can extend into this hollow space, and the link guide can move relative to the cam to lift or lower the holder.

In another embodiment of the labeler according to the present invention, the holder is guided by a support arm that is movably mounted in the casing. This makes the design of the holder simple, facilitated by coupling the cap and the holder, which eliminates the use of a pair of articulated arms that represents the state of the art.

In another embodiment of the labeler according to the present invention, the support arm is fixed to the flange. The hub for pivoting the label roll is thus simply conducted in linear direction with the help of the support arm, and the swinging movement between the cap and the holder is achieved simply using the arched link guide.

BRIEF DESCRIPTION OF SEVERAL VIEWS OF THE DRAWINGS

The invention will be described in conjunction with the following drawings in which like reference numerals designate like elements and wherein.

DETAILED DESCRIPTION OF THE INVENTION

The present invention relates to a hand-held labeler comprising a casing with an upper opening, a holder for rotary mounting a label roll that is at least partially positioned within the upper opening, a cap that surrounds and is spaced from at least an upper perimeter of a label roll inserted into said upper opening, and a lifting mechanism for moving the holder up and down.

Figure 1:
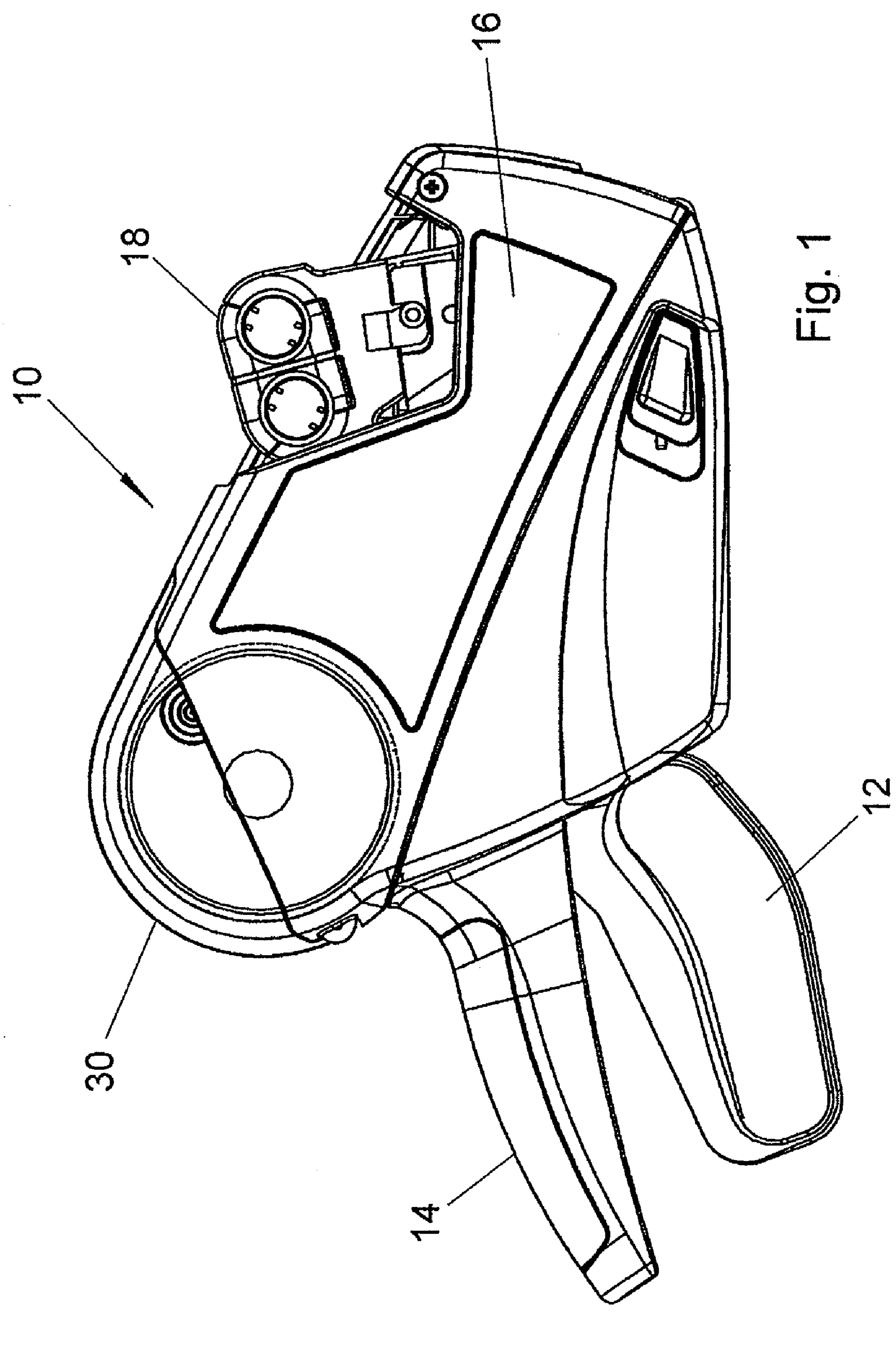
FIG. 1 shows a side view of a preferred embodiment of a hand-held labeler according to the present invention.

In FIG. 1, a side view of a hand-held labeler according to the present invention is shown and generally designated 10. The hand-held labeler 10 is used for printing, dispensing, and attaching self-adhesive labels onto objects in the course of an operating cycle that is actuated by moving a lever 12 relative to a rigidly mounted handle 14. A printer 18 with printing types for printing on a label in printing position is housed in a casing 16 of the hand-held labeler 10. The labels are moved one after the other into the printing position and into the position for attaching them to objects using a transport mechanism that is actuated by the lever 12. For this purpose, the transport mechanism pulls off a carrier tape that holds the labels from the label roll 20 shown in FIG. 3.

Figure 2:
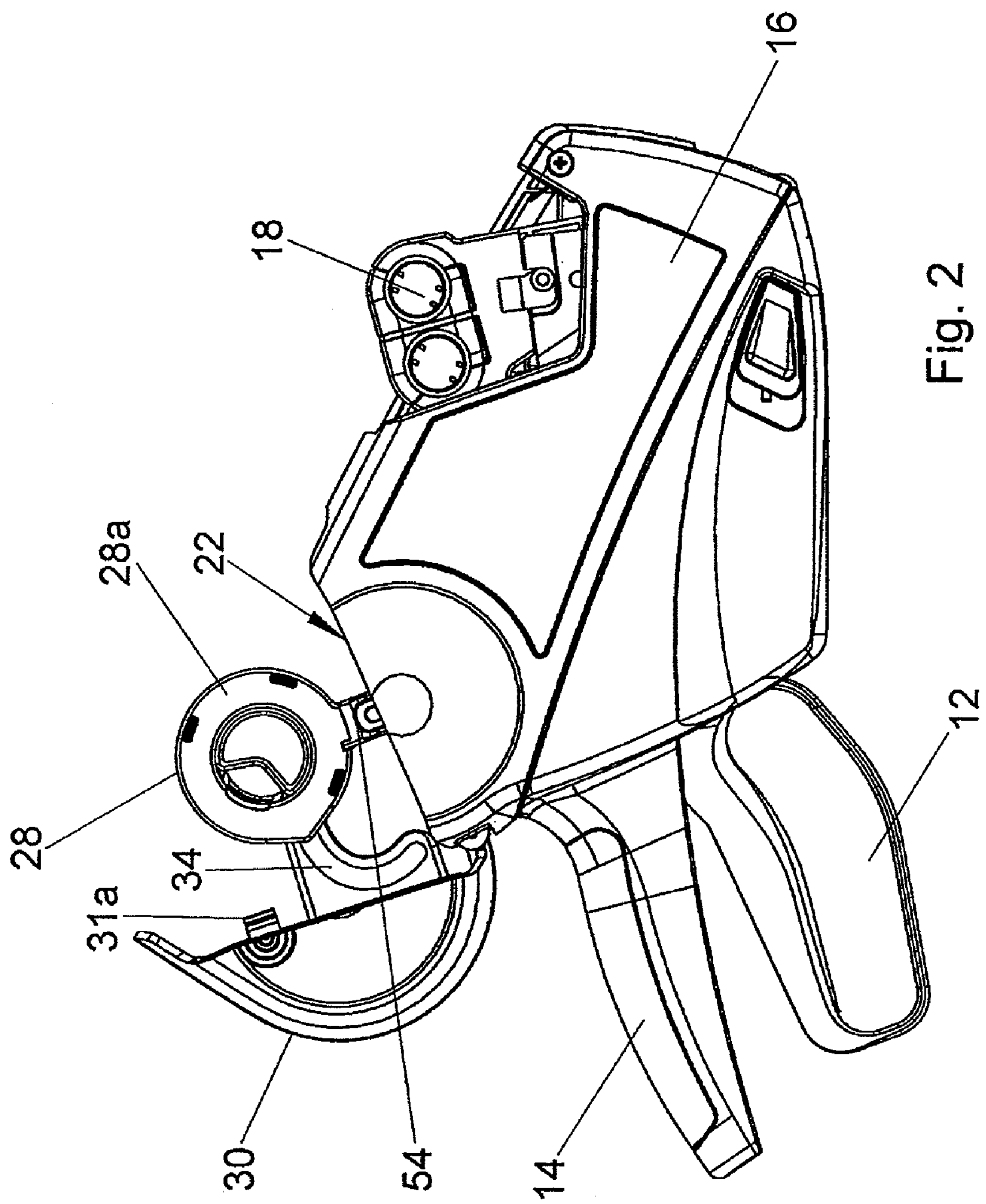
FIG. 2 shows the same view of the hand-held labeler as in FIG. 1 but with the cap swung open.
Figure 3:
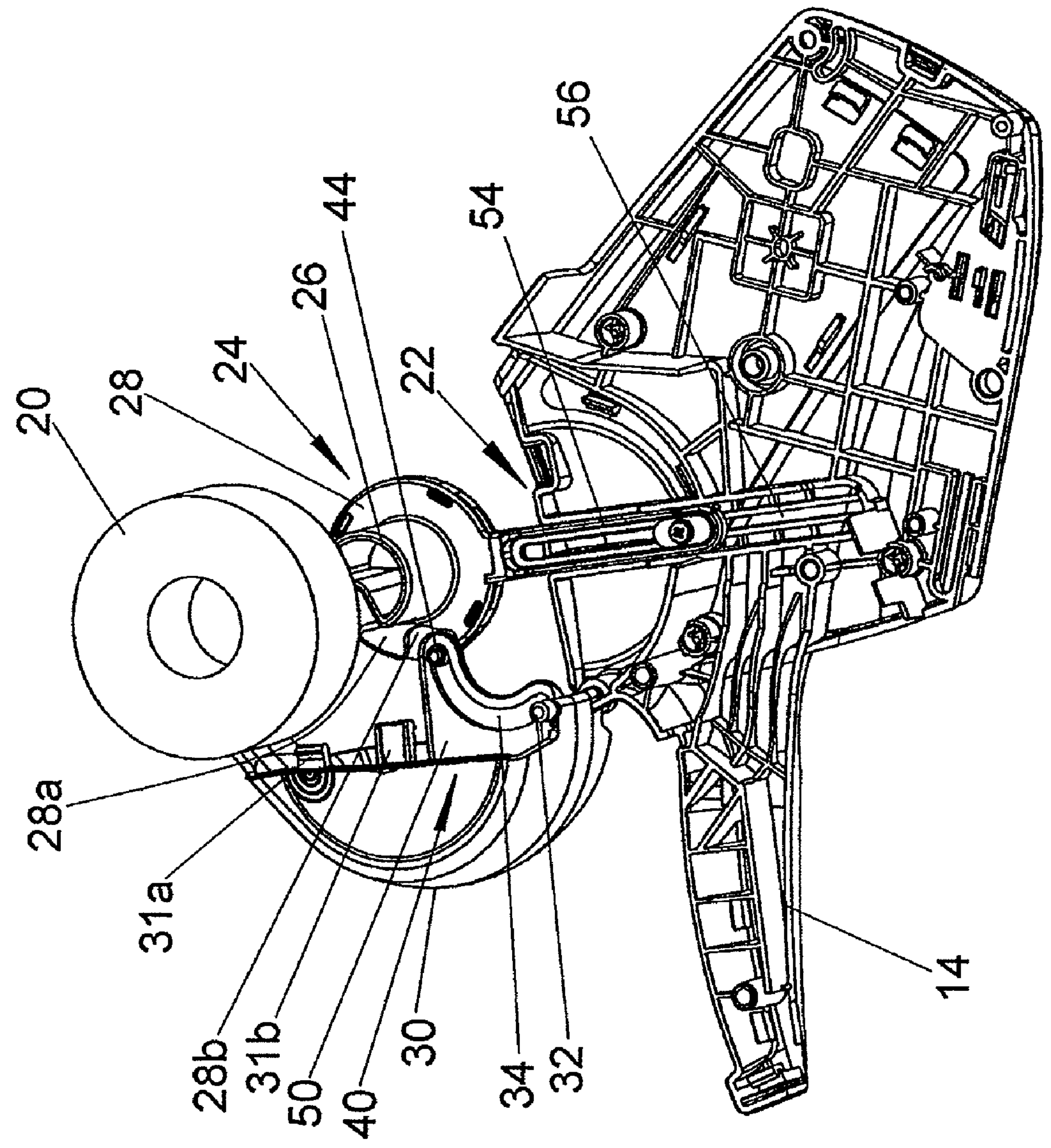
FIG. 3 shows a perspective view of the hand-held labeler according to FIG. 2 of which only one half is shown to expose the guidance of a holder of a label roll that is shown pulled off its holder.

The casing 16 comprises an upper opening 22. A holder generally designated 24 in FIG. 3 is used for rotary mounting the label roll 20. A cap 30 is hinged to swing about an axis 32 (FIG. 3) onto the upper opening 22 on the casing 16. Thus the cap 30 can be swung between an open position shown in FIG. 2 and a closed position shown in FIG. 1. The holder 24 can be moved from an extended position shown in FIGS. 2 and 3 into a retracted position in which the label roll 20 is partially sunk into the upper opening 22 and the cap 30 is closed as shown in FIG. 1 using a lifting mechanism 40. The cap 30 surrounds the label roll 20 completely in the position shown in FIG. 1 in which the label roll 20 is partially sunk into the upper opening 22.

The lifting mechanism 40 includes a mechanical coupling between the cap 30 and the holder 24. By manually swinging the cap 30, the holder 24 can be moved out of the upper opening 22 and into the upper opening 22 while increasing or decreasing the spacing between the cap 30 and the holder 24. A large spacing is formed between the cap 30 and the holder 24 in the position shown in FIGS. 2 and 3. A small spacing is formed between the cap 30 and the holder 24 in the position shown in FIG. 1.

The mechanical coupling comprises a link guide 34 arranged at the cap 30 and a cam associated with the holder 24 that is formed by a pin 44 and engages in the link guide 34. The link guide 34 is formed in an extension 50 of a side wall of the cap 30 and is a slot-like arched recess 52 as shown, or could instead have a groove-like configuration. The term "cap" as used herein does not include the extension 50. The cap is that part which closes the upper opening 22 of the casing 16.

The holder 24 comprises a freely rotatable hub 26 with a flange 28 for rotary mounting the label roll 20. The flange 28 is made of two disks 28*a*, 28*b* separated by a spacing. The disk 28*b* is visible only in the broken-up area around the pin 44 in FIG. 3. There is a hollow space between the disks 28*a*/28*b* into which the pin 44 extends that forms the cam. The extension 50 of the cap 30 can be moved clockwise from the position shown in FIG. 3 into the hollow space of the flange 28, which moves the pin 44 and thus the holder 24 shown in FIG. 3 more and more downwards. The holder 24 is guided by a support arm 54 that is movably mounted in the casing 16. The support arm 54 is attached to the flange 28. As can be seen in FIG. 3, the casing comprises a guide groove 56 for guiding the support arm 54.

The cap 30 comprises at its lower rim two elastic tabs 31*a*, 31*b* with which it can be snapped into place on the upper rim of the opening 22 in the position shown in FIG. 1. When the cap 30 is grabbed with the fingers in the position shown in FIG. 1 and swung open, the elastic tabs 31*a*, 31*b* will yield. When the cap 30 is swung into the position shown in FIG. 2, the holder 24 is moved along via the link guide 34 that guides the pin 44 into the upper position shown in FIGS. 2 and 3 in which the label roll 20 or the core that remains from a label roll can be pulled off the hub 26 and replaced with a new label roll 20. When the cap 30 is closed again, it inevitably moves the holder 24 with the label roll 20 back into the casing until it finally surrounds the label roll 20 completely in the position shown in FIG. 1 in which it encloses the upper perimeter of the label roll 20 in the opening 22 at a spacing.

While the invention has been described in detail and with reference to specific examples thereof, it will be apparent to one skilled in the art that various changes and modifications can be made therein without departing from the spirit and scope thereof.

What is claimed is:

1. A hand-held labeler comprising a casing with an upper opening;

a holder for rotary mounting a label roll that is at least partially positioned within said upper opening;

a cap pivotally coupled to said case adjacent said upper opening, said cap covering an upper portion of said label roll when said label roll is inserted into said upper opening and said cap is pivoted to be in contact with said casing;

a lifting mechanism for moving said holder up and down; and wherein said lifting mechanism includes a mechanical coupling between said cap and said holder such that said holder can be moved out of said upper opening or into said upper opening by manually swinging said cap away from casing or towards said casing, respectively, said mechanical coupling comprising a slot or groove-like arched recess in, or on an extension of, a side wall of said cap and a pin extending from said holder and engaging in said recess, and wherein said holder further comprises a support arm that is movably mounted in said casing.

2. The hand-held labeler according to claim 1 wherein said holder for rotary mounting a label roll comprises a hub with a flange into, or onto, which said pin is attached and in, or on, which said side wall extension with said link guide can be moved.

3. The hand-held labeler according to claim 2 wherein said flange is made of two disks arranged at a spacing between which a hollow space is formed into which said pin extends.

4. The hand-held labeler according to claim 1 wherein said support arm is fixed to the flange.

5. The hand-held labeler according to claim 1 wherein said support arm is slidably movable within a guide groove positioned within said casing.

* * * * *

UNITED STATES PATENT AND TRADEMARK OFFICE

CERTIFICATE OF CORRECTION

PATENT NO. : 8,376,015 B2
APPLICATION NO. : 13/193908
DATED : February 19, 2013
INVENTOR(S) : Harald Guenter et al.

It is certified that error appears in the above-identified patent and that said Letters Patent is hereby corrected as shown below:

In the Claims:

Col. 5, Claim 1, line 16, before the first occurrence of the word “casing”, insert --said--.

Col. 6, Claim 2, line 4, replace the term “link guide” with --slot or groove-like arched recess--.

Signed and Sealed this
Eleventh Day of June, 2013

Teresa Stanek Rea
*Acting Director of the United States Patent and Trademark Office*